United States Patent
Mukherjee et al.

(10) Patent No.: US 10,666,488 B2
(45) Date of Patent: May 26, 2020

(54) WIRELESS DEVICE, A NETWORK NODE AND METHODS THEREIN FOR IMPROVED SIGNALING IN A WIRELESS COMMUNICATIONS NETWORK

(71) Applicant: Telefonaktiebolaget LM Ericsson (publ), Stockholm (SE)

(72) Inventors: Amitav Mukherjee, Fremont, CA (US); Jung-Fu Cheng, Fremont, CA (US); Havish Koorapaty, Saratoga, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 8 days.

(21) Appl. No.: 15/531,752

(22) PCT Filed: Mar. 28, 2017

(86) PCT No.: PCT/SE2017/050299
§ 371 (c)(1),
(2) Date: May 31, 2017

(87) PCT Pub. No.: WO2017/171613
PCT Pub. Date: Oct. 5, 2017

(65) Prior Publication Data
US 2018/0191547 A1 Jul. 5, 2018

Related U.S. Application Data

(60) Provisional application No. 62/316,812, filed on Apr. 1, 2016.

(51) Int. Cl.
*H04L 27/26* (2006.01)
*H04W 72/04* (2009.01)
(Continued)

(52) U.S. Cl.
CPC ....... *H04L 27/2692* (2013.01); *H04W 72/042* (2013.01); *H04W 72/0446* (2013.01); *H04W 74/006* (2013.01); *H04W 74/0808* (2013.01)

(58) Field of Classification Search
CPC ............ H04L 27/2692; H04W 72/042; H04W 72/0446; H04W 74/0808; H04W 74/006
See application file for complete search history.

(56) References Cited

U.S. PATENT DOCUMENTS

2012/0275355 A1   11/2012  Park et al.
2015/0264662 A1   9/2015   Sahlin et al.
(Continued)

OTHER PUBLICATIONS

Unknown, Author, "Discussion on issues related to PUSCH transmission for LAA", CMCC, 3GPP TSG RAN WG1 Meeting #84, R1-160495, St Julian's, Malta, Feb. 15-19, 2016, 1-4.
(Continued)

*Primary Examiner* — Jackie Zuniga Abad
(74) *Attorney, Agent, or Firm* — Sage Patent Group

(57) ABSTRACT

Embodiments herein relate to a method performed by network node (110) in a wireless communications network (100). The network node (110) transmits a number of bits indicating an uplink duration and an offset for a burst of uplink subframes to a wireless device (121) in a downlink subframe on a downlink control channel. Embodiments herein also relate to a method performed by a wireless device (121) in a wireless communications network (100). The wireless device (121) receives a number of bits indicating an uplink duration and an offset for a burst of uplink subframes to a wireless device (121) in a downlink subframe on a downlink control channel. Embodiments of the network node (110) and the wireless device (121) are also described.

26 Claims, 7 Drawing Sheets

(51) Int. Cl.
*H04W 74/00* (2009.01)
*H04W 74/08* (2009.01)

(56) References Cited

U.S. PATENT DOCUMENTS

2016/0073344 A1    3/2016  Vutukuri et al.
2017/0223675 A1*   8/2017  Dinan ................ H04W 72/042

OTHER PUBLICATIONS

Unknown, Author, "UL LBT design in Rel-14 eLAA", ITL, 3GPP TSG RAN WG1 meeting #84, R1-161029, St Julian's, Malta, Feb. 15-19, 2016, 1-6.

* cited by examiner

WIRELESS DEVICE, A NETWORK NODE AND METHODS THEREIN FOR IMPROVED SIGNALING IN A WIRELESS COMMUNICATIONS NETWORK

TECHNICAL FIELD

Embodiments herein relate to signaling in a wireless communications network. In particular, embodiments herein relate to a wireless device and a method therein for improving signaling in a wireless communications network. Also, embodiments herein relate to a network node and a method therein for improving signaling in a wireless communications network.

BACKGROUND

Communication devices such as wireless devices are also known as, e.g., User Equipments (UE), mobile terminals, terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Wireless devices may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

The 3GPP Rel-13 feature "Licensed-Assisted Access" (LAA) allows LTE equipment to also operate in the unlicensed 5 GHz radio spectrum. The unlicensed 5 GHz spectrum is used as a complement to the licensed spectrum. An on-going 3GPP Rel-14 work item will add UL transmissions to LAA. Accordingly, devices connect in the licensed spectrum (primary cell or PCell) and use carrier aggregation to benefit from additional transmission capacity in the unlicensed spectrum (secondary cell or SCell). Standalone operation of LTE in unlicensed spectrum is also possible and is under development by the MuLTEfire Alliance.

Regulatory requirements, however, may not permit transmissions in the unlicensed spectrum without prior channel sensing. Since the unlicensed spectrum must be shared with other radios of similar or dissimilar wireless technologies, a so called listen-before-talk (LBT) method needs to be applied. LBT involves sensing the medium for a pre-defined minimum amount of time and backing off if the channel is busy. Today, the unlicensed 5 GHz spectrum is mainly used by equipment implementing the IEEE 802.11 Wireless Local Area Network (WLAN) standard. This standard is known under its marketing brand "Wi-Fi".

Long Term Evolution (LTE)

LTE uses OFDM in the downlink and DFT-spread OFDM (also referred to as single-carrier FDMA) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE downlink transmissions are organized into radio frames of 10 ms, each radio frame consisting of ten equally-sized subframes of length Tsubframe=1 ms as shown in FIG. 1. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 2. The reference symbols shown there are the cell specific reference symbols (CRS) and are used to support multiple functions including fine time and frequency synchronization and channel estimation for certain transmission modes.

Uplink transmissions are dynamically scheduled, i.e., in each downlink subframe the base station transmits control information about which terminals should transmit data to the eNB in subsequent subframes, and upon which resource blocks the data is transmitted. The uplink resource grid is comprised of data and uplink control information in the PUSCH, uplink control information in the PUCCH, and various reference signals such as demodulation reference signals (DMRS) and sounding reference signals (SRS). DMRS are used for coherent demodulation of PUSCH and PUCCH data, whereas SRS is not associated with any data or control information but is generally used to estimate the uplink channel quality for purposes of frequency-selective scheduling. An example uplink subframe is shown in FIG. 4. Note that UL DMRS and SRS are time-multiplexed into the UL subframe, and SRS are always transmitted in the last symbol of a normal UL subframe. The PUSCH DMRS is transmitted once every slot for subframes with normal cyclic prefix, and is located in the fourth and eleventh SC-FDMA symbols.

From LTE Rel-11 onwards, DL or UL resource assignments can also be scheduled on the enhanced Physical Downlink Control Channel (EPDCCH). For Rel-8 to Rel-10 only the Physical Downlink Control Channel (PDCCH) is available. Resource grants are UE specific and are indicated by scrambling the DCI Cyclic Redundancy Check (CRC) with the UE-specific C-RNTI identifier.

eIMTA Signaling

In Rel-12 LTE, dynamic TDD or eIMTA (enhanced Interference Mitigation and Traffic Adaptation) was introduced as a feature. Here, the serving cell can dynamically change the cell TDD configuration on a per-frame basis. The configuration is signaled using the (e)PDCCH after scrambling with the eIMTA RNTI. The choice of the cell DL/UL subframe configuration is limited to the 7 TDD configurations in legacy LTE, therefore arbitrary DL/UL allocations within a frame are not allowed.

Carrier Aggregation

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least the possibility to have, the same structure as a Rel-8 carrier. CA is illustrated in FIG. 5. A CA-capable UE is assigned a primary cell (PCell) which is always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

Wireless Local Area Network

In typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle.

A general illustration of the listen before talk (LBT) mechanism of Wi-Fi is shown in FIG. 6. After a Wi-Fi station A transmits a data frame to a station B, station B shall transmit the ACK frame back to station A with a delay of 16 µs. Such an ACK frame is transmitted by station B without performing a LBT operation. To prevent another station interfering with such an ACK frame transmission, a station shall defer for a duration of 34 µs (referred to as DIFS) after the channel is observed to be occupied before assessing again whether the channel is occupied. Therefore, a station that wishes to transmit first performs a CCA by sensing the medium for a fixed duration DIFS. If the medium is idle then the station assumes that it may take ownership of the medium and begin a frame exchange sequence. If the medium is busy, the station waits for the medium to go idle, defers for DIFS, and waits for a further random backoff period.

In the above basic protocol, when the medium becomes available, multiple Wi-Fi stations may be ready to transmit, which can result in collision. To reduce collisions, stations intending to transmit select a random backoff counter and defer for that number of slot channel idle times. The random backoff counter is selected as a random integer drawn from a uniform distribution over the interval of [0, CW]. The default size of the random backoff contention window, CWmin, is set in the IEEE specs. Note that collisions can still happen even under this random backoff protocol when there are many stations contending for the channel access. Hence, to avoid recurring collisions, the backoff contention window size CW is doubled whenever the station detects a collision of its transmission up to a limit, CWmax, also set in the IEEE specs. When a station succeeds in a transmission without collision, it resets its random backoff contention window size back to the default value CWmin.

LTE in Unlicensed Spectrum

Up to now, the spectrum used by LTE is dedicated to LTE. This has the advantage that LTE system does not need to care about the coexistence issue and the spectrum efficiency can be maximized. However, the spectrum allocated to LTE is limited which cannot meet the ever increasing demand for larger throughput from applications/services. Therefore, Rel-13 LAA extended LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to transmit essential control signals and channels on a licensed carrier. That is, as shown in FIG. 7, a UE is connected to a PCell in the licensed band and one or more SCells in the unlicensed band. In this application we denote a secondary cell in unlicensed spectrum as licensed-assisted access secondary cell (LAA SCell). In the case of standalone operation as in MuLTEfire, no licensed cell is available for uplink control signal transmissions.

The maximum channel occupancy time (MCOT) of a single DL+UL TXOP in unlicensed bands is limited by regional regulatory restrictions. For example, in Europe, EN BRAN is considering the following MCOT rules:

Specify max TxOP=6 ms available for 100% of the time
Specify max TxOP=8 ms is available for 100% of time with a minimum pause of [TBD] μs (in order of 100's μs) after a maximum transmission of 6 ms
Specify max TxOP=10 ms is available for [TBD3] % of the time.

DL Signaling in C-PDCCH in LAA

In Rel-13 DL-only LAA, it was agreed that the length of an ending partial DL subframe, where the partial subframe is the last subframe of a DL burst, can be indicated to UEs via common PDCCH (C-PDCCH) signaling. If the UE detects common PDCCH DCI referring to subframe n in subframes n−1 or n, the UE may assume the number of OFDM symbols in subframe n according to the detected DCI. If the end subframe is a partial DL subframe, then the end partial subframe configuration of a DL transmission burst is indicated to the UE in the end subframe and the previous subframe. The following information can be signaled in Rel-13 LAA (e)PDCCH using four bits in DCI Format 1C (as seen by Table 1):

TABLE 1

C-PDCCH signaling for ending partial DL subframes in Rel-13 LAA

| | |
|---|---|
| 0 | Next subframe is 3 OFDM symbols |
| 1 | Next subframe is 6 OFDM symbols |
| 2 | Next subframe is 9 OFDM symbols |
| 3 | Next subframe is 10 OFDM symbols |
| 4 | Next subframe is 11 OFDM symbols |
| 5 | Next subframe is 12 OFDM symbols |
| 6 | Next subframe is full (14 Symbols) |
| 7 | Current subframe is partial 3 OFDM symbols |
| 8 | Current subframe is partial 6 OFDM symbols |
| 9 | Current subframe is partial 9 OFDM symbols |
| 10 | Current subframe is partial 10 OFDM symbols |
| 11 | Current subframe is partial 11 OFDM symbols |
| 12 | Current subframe is partial 12 OFDM symbols |
| 13 | Current subframe is full (14 Symbols) and end of transmission |
| 14 | Reserved |
| 15 | Reserved |

UCCH and Cross-TXOP Scheduling in MuLTEfire

Two forms of PUCCH transmission have been defined for MuLTEfire: a short PUCCH (sPUCCH) comprising between two to six symbols in time, and a longer, enhanced PUCCH (ePUCCH) which spans one subframe in time, as shown in FIG. 8. The sPUCCH occurs immediately after the DwPTS portion of a partial DL subframe as indicated by C-PDCCH signaling from Rel-13 LAA, while the ePUCCH can be multiplexed with PUSCH transmissions in 1-ms UL subframes. For the triggering of ePUCCH transmissions, both common PDCCH (C-PDCCH) or UL grant (DCI based) based triggers are supported, eNB can use either or both mechanisms.

Regarding UL scheduling in MuLTEfire, the UL grant and the corresponding UL transmission(s) do not need to be contained within the same TXOP. The following procedures are supported when scheduling UL transmissions across TXOPs:

Option 1: eNB schedules UE with a fixed time relationship between grants and transmission, where the delay between grant and start of UL transmission can be 4 ms or longer. The eNB may signal the type of LBT to be performed by the UE in the grant (e.g., 25 μs or Cat-4 LBT depending on transmission time relative to TxOP limit).

Option 2: eNB schedules UE without a fixed time relationship between grant and UL transmission. UE transmits after a minimum delay m1 since the grant was received, m1>=4 ms, and only after further receiving a trigger sent by eNB on the C-PDCCH. The UL LBT is 25 μs in this case. If the C-PDCCH trigger is not received within a time m2, the UE does not transmit and drops the grant. The parameter m1 is carried in the UL grant, while parameter m2 is configured using higher-layer signalling.

SUMMARY

It is an object of embodiments herein to improve signalling in a wireless communications network.

According to a first aspect of embodiments herein, the object is achieved by a method performed by a network node in a wireless communications network. The network node transmit a number of bits indicating an uplink duration and an offset for a burst of uplink subframes to a wireless device in a downlink subframe on a downlink control channel.

According to a second aspect of embodiments herein, the object is achieved by a network node in a wireless communications network. The network node is configured to transmit a number of bits indicating an uplink duration and an offset for a burst of uplink subframes to a wireless device in a downlink subframe on a downlink control channel.

According to a third aspect of embodiments herein, the object is achieved by a method performed by a wireless device in a wireless communications network. The wireless device receives a number of bits indicating an uplink duration and an offset for a burst of uplink subframes to a wireless device in a downlink subframe on a downlink control channel.

According to a fourth aspect of embodiments herein, the object is achieved by a wireless device in a wireless communications network. The wireless device being configured to receive a number of bits indicating an uplink duration and an offset for a burst of uplink subframes to a wireless device in a downlink subframe on a downlink control channel.

According to a fifth aspect of embodiments herein, the object is achieved by a computer program, comprising instructions which, when executed on at least one processor, cause the at least one processor to carry out the method described above. According to a sixth aspect of embodiments herein, the object is achieved by a carrier containing the computer program described above, wherein the carrier is one of an electronic signal, optical signal, radio signal, or computer readable storage medium.

By indicating an uplink duration and an offset for a burst of uplink subframes to a wireless device in wireless communications network as described above, a dynamic signalling of the UL/DL allocation of upcoming subframes in a wireless communications network is provided. This advantageously allows the wireless device to be notified of upcoming subframes in which they do not need to monitor the PDCCH. This will save power in the wireless device, since less battery power will be needed. Furthermore, this also advantageously allows the wireless device to be notified of upcoming subframes that provide uplink transmission opportunities for, for example, UCI, SR, PRACH, and SRS. Hence, signalling in the wireless communications network is improved.

BRIEF DESCRIPTION OF THE DRAWINGS

Examples of embodiments herein are described in more detail with reference to the accompanying drawings, in which:

FIG. 3 is a schematic illustration of a downlink subframe,

DETAILED DESCRIPTION

Figure 1:
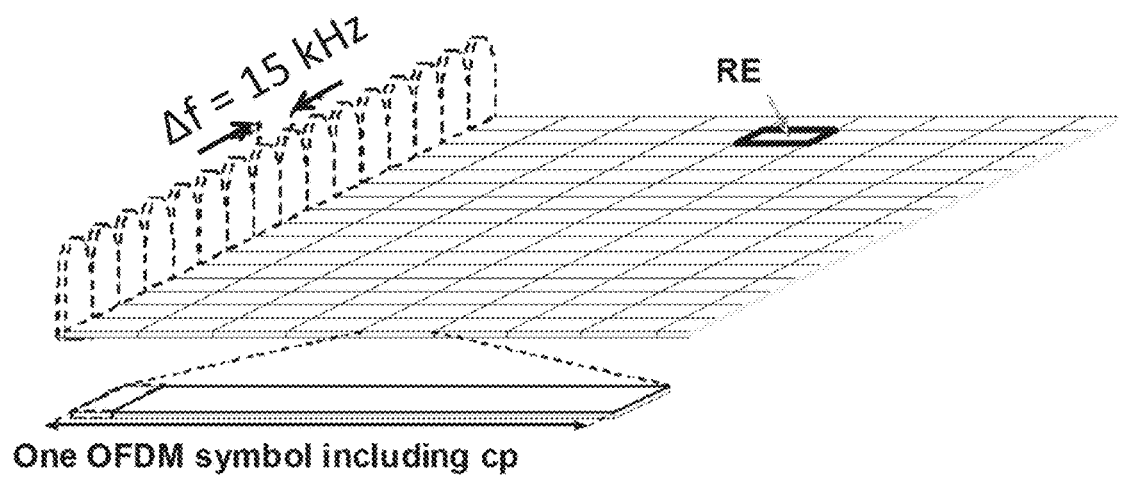
Figure 2:
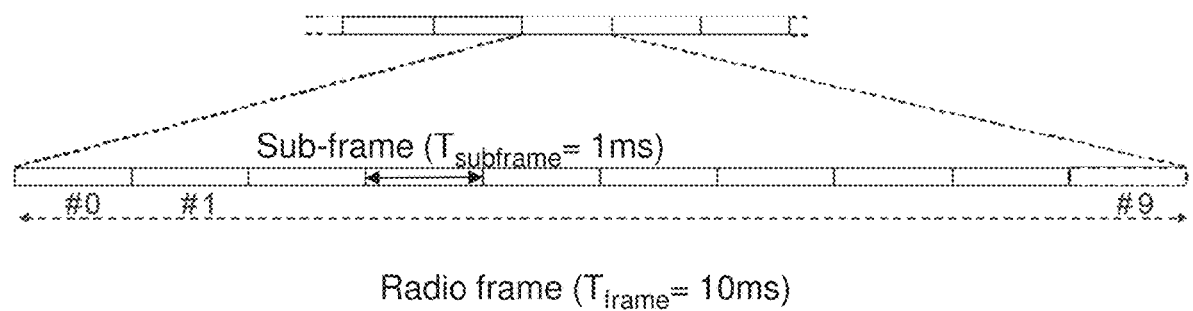
FIG. 2 is a schematic illustration of an LTE time-domain structure.
Figure 3:
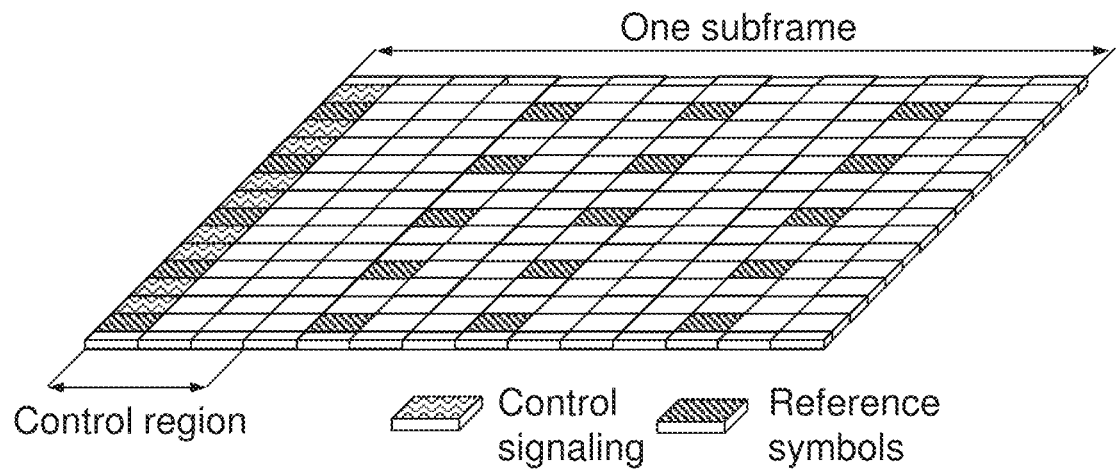
FIG. 3 is a schematic illustration of the LTE downlink physical resource.

The figures are schematic and simplified for clarity, and they merely show details which are essential to the understanding of the embodiments presented herein, while other details have been left out. Throughout, the same reference numerals are used for identical or corresponding parts or steps.

Figure 9:
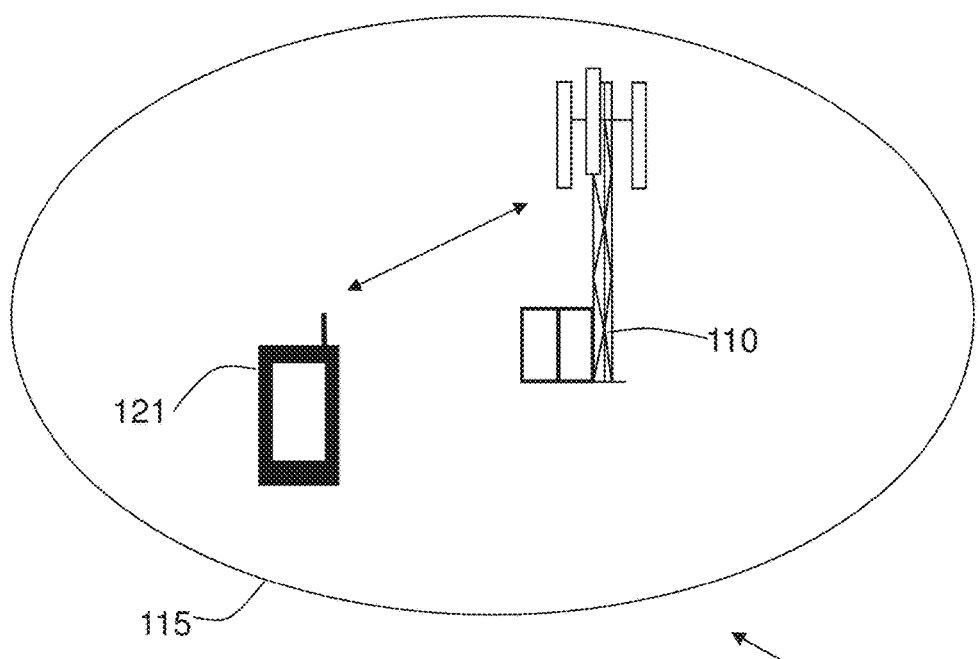
FIG. 9 is a schematic diagram depicting a wireless communications network.

FIG. 9 depicts a wireless communications network 100 in which embodiments herein may operate. In some embodiments, the wireless communications network 100 may be a radio communications network such as a Long Term Evolution, LTE, network. Although, the wireless communications network 100 is exemplified herein as an LTE network, the wireless communications network 100 may also employ technology of any one of LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM, or any other similar network or system. The wireless communications network 100 may also be an Ultra Dense Network, UDN, which e.g. may transmit on millimetre-waves (mmW).

In some embodiments, the wireless communications network 100 may be a cellular or radio communication systems capable of operating in parts of the so-called unlicensed spectrum, i.e. utilizing transmission resources, e.g. frequency bands, carriers, or channels, which are shared and decentralized and not licensed to a particular type of scheduled wireless or radio communication. In other words, when a network operator owns the communication network and offers the implemented services to its subscribers over a set of carriers, the carriers are referred to as licensed carriers. A licensed carrier refers to a carrier that is licensed to a licensee that has an exclusive right to the spectrum in a defined area. The licensed carrier is e.g. licensed to the owner of a wireless communication network, i.e., the network operator. One advantage associated with a licensed spectrum and a licensed carrier is that the license enables the licensee to control the transmission resources. In the case of an unlicensed spectrum, any communication node, e.g. network node or wireless device, regardless of its subscription or affiliation to any operator is allowed to access transmission resources of the unlicensed spectrum. No operator is assigned or owns a license for operating the transmission resources of the unlicensed spectrum.

Furthermore, it should also be noted that the access of transmission resources on a licensed frequency spectrum may be contention-free, which means that the transmission resources may only be used by those wireless devices which subscribe to a designated operator and by those network nodes that belongs to the network owned by the operator. Only the designated operator is assigned the license to operate such licensed frequency spectrum. On the contrary, the access of transmission resources on an unlicensed frequency spectrum may be referred to as contention-based.

Hence, in some embodiments, the wireless communications network 100 may be configured to provide License Assisted Access, LAA, for wireless devices to the unlicensed spectrum. In case of using LTE, this may be denoted as LTE-LAA. In some embodiments, the wireless communications network 100 may also be configured to provide stand-alone access to the unlicensed spectrum. In case of using LTE, this may be denoted as LTE Unlicensed, LTE-U.

The wireless communications network 100 comprises a network node 110. The network node 110 serves at least one coverage area 115. The coverage area 115 may in some cases also be referred to as a cell. In some embodiments, the network node 110 may be configured to provide stand-alone access or Licensed Assisted Access, LAA, in the unlicensed spectrum to wireless devices in the wireless communications network 100. In this case, communicating in the licensed spectrum may be referred to as communicating on a primary carrier, i.e. a primary cell, PCell, for the LAA, while communicating in the unlicensed spectrum may be referred to as communicating on a secondary carrier, i.e. a secondary cell, SCell, for the LAA. The secondary carrier or SCell may operate with both uplink, UL, and downlink, DL, traffic.

The network node 110 may correspond to any type of network node or radio network node capable of communicating with a wireless device and/or with another network node, such as, e.g. be a base station, a radio base station, eNB, eNodeB, a Home Node B, a Home eNode B, femto Base Station (BS), pico BS, etc., in the wireless communications network 100. Further examples of the network node 110 may also be e.g. repeater, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), core network node (e.g. MSC, MME, etc.), O&M, OSS, SON, positioning node (e.g. E-SMLC), MDT, etc. In the unlicensed spectrum, the network node 110 may also be referred to as an access point, AP.

In FIG. 9, a wireless devices 121 is located within the coverage area 115. The wireless device 121 is configured to communicate within the wireless communications network 100 via the network node 110 over a radio link served by the network node 110. The wireless device 121 may refer to any type of wireless device or user equipment (UE) communicating with a network node and/or with another wireless device in a cellular, mobile or radio communication network or system. Examples of such a wireless devices are mobile phones, cellular phones, Personal Digital Assistants (PDAs), smart phones, tablets, sensors equipped with a UE, Laptop Mounted Equipment (LME) (e.g. USB), Laptop Embedded Equipments (LEEs), Machine Type Communication (MTC) devices, or Machine to Machine (M2M) device, Customer Premises Equipment (CPE), target device, device-to-device (D2D) wireless device, wireless device capable of machine to machine (M2M) communication, etc. In the unlicensed spectrum, the wireless devices 121-129 may also be referred to as stations, STAs.

As part of the developing of the embodiments described herein, a problem will first be identified and discussed.

Figure 10:
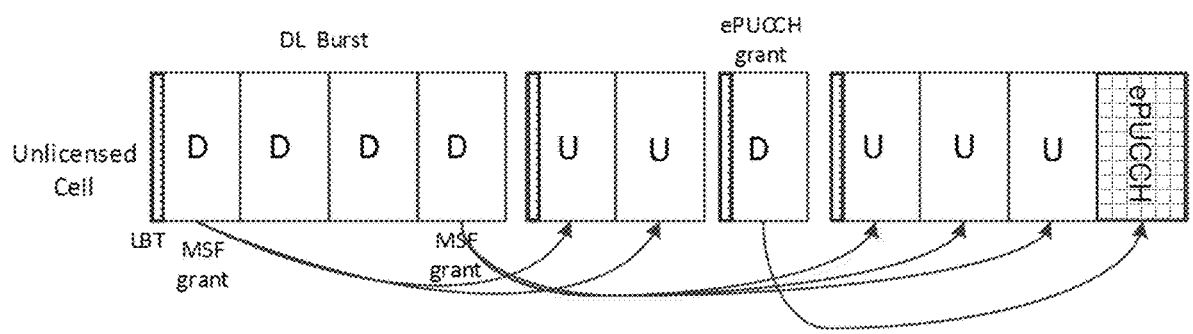
FIG. 10 illustrates an example of dynamic adaptation of DL and UL subframes on a cell operating in the unlicensed spectrum.

In the existing Rel-13 C-PDCCH signaling only DL full or partial end subframes is covered. However, in Rel-14 eLAA and MuLTEfire, both UL subframes and DL subframes may occur within a frame or across TXOPs, as shown in FIG. 10. It has thus been realized that it may be advantageous to signal on the DL, the occurrence of upcoming UL subframes. This may, for example, be performed for the purposes of UE power saving, since the UEs may then stop monitoring PDCCH on upcoming UL subframes. Therefore, being able to provide an enhanced C-PDCCH signaling in order to indicate upcoming UL subframes and to trigger other UL transmissions, such as, e.g. ePUCCH, would be advantageous.

This issue is addressed by embodiments described herein, which are exemplified and explained in more detail below with reference to the figures and tables herein.

In the embodiments described herein, a dynamic signalling of the UL/DL allocation of upcoming subframes in a wireless communications network is provided. According to some examples, these embodiments are applicable in wireless communications network utilizing, for example, MuLTEfire, Rel-14 eLAA, LTE in Rel-14 and beyond with multi-subframe grant support, other versions of LTE in unlicensed bands, and NX/5G systems in unlicensed spectrum, etc. One advantage of the embodiments described herein is that the wireless devices, or UEs, may be notified of upcoming subframes in which they do not need to monitor the PDCCH. This will save power in the wireless device, since less battery power will be needed. Another advantage of the embodiments described herein is that the wireless devices may be notified of upcoming subframes that provide uplink transmission opportunities for UCI, SR, PRACH, and SRS. Hence, signalling in the wireless communications network may be improved.

Figure 11:
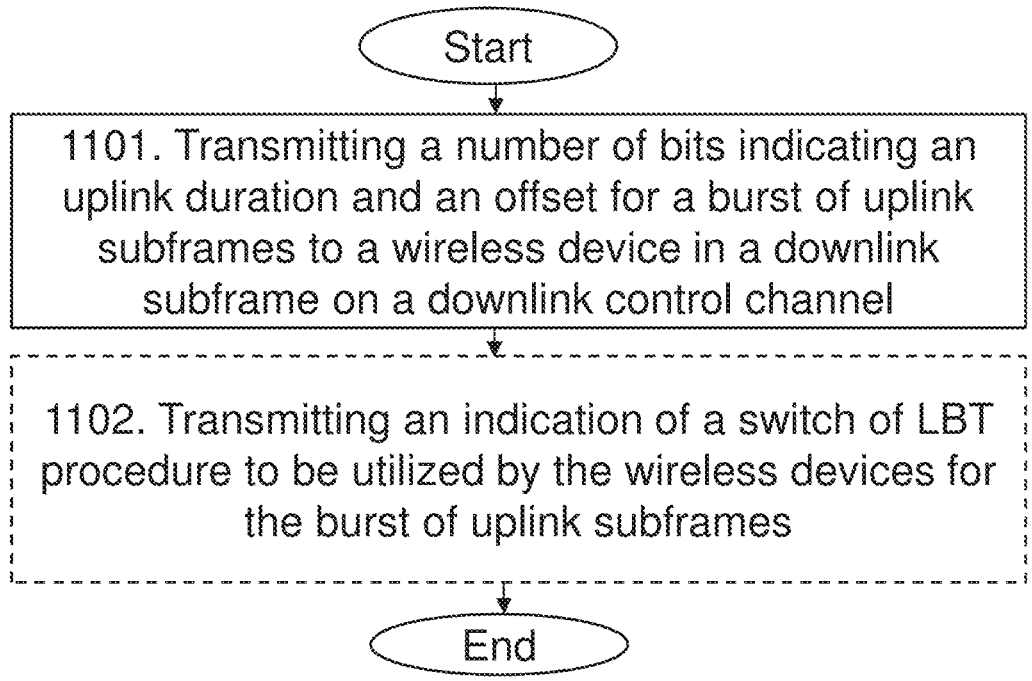
FIG. 11 is a flowchart depicting embodiments of a method in a network node.

Example of embodiments of a method performed by a network node 110 in the wireless communications network 100, will now be described with reference to the flowchart depicted in FIG. 11. FIG. 11 illustrates an example of actions or operations which may be taken by the network node 110. The method may comprise the following actions.

Action 1101

The network node 110 may first transmit a number of bits indicating an uplink duration and an offset for a burst of uplink subframes to a wireless device in a downlink subframe on a downlink control channel. In some embodiments, the offset may indicate a number of subframes to the start of the burst of uplink subframes from the downlink subframe, and the uplink duration indicates the number of subframes comprised in the burst of uplink frames. In other words, in some embodiments, the Y bits may be used to indicate the characteristics of a burst of contiguous UL subframes, e.g. by the network node 110 to the wireless device 121. Consider the case where in DL subframe n, the C-PDCCH is used to indicate a burst of UL subframes starting in SF n+a and concluding in SF n+b, where a=1.2, . . . A, b≥a, and A is either determined by the network node 110 or is a pre-defined maximum value. In subframe n, the Y bits therefore indicate the offset until the starting subframe of the UL burst (using approximately log 2(a) bits), and also indicate the offset until the last subframe of the upcoming UL burst (using approximately log 2(b) bits or alternatively, using approximately log 2(b−a) bits).

In some embodiments and as an additional non-limiting example of the use of the Y bits, the characteristics of multiple bursts of contiguous UL subframes may be indicated. Here, the offsets of the starting and ending subframes for each of the contiguous bursts may be indicated. The offsets of the start of one burst may be indicated in reference to the end of the previous burst.

Action 1102

Optionally, in some embodiments, the network node 110 may further transmit an indication of a switch of Listen-Before-Talk, LBT, procedure to be utilized by the wireless devices 121 for the burst of uplink subframes. In other words, in some embodiments, the C-PDCCH in DL subframe n is used to indicate the UL LBT procedure to be followed by a wireless device 121 in subframe n+1, where said wireless device 121 has received an UL grant in subframe n−1 or earlier. In some embodiments, in subframe n−4, one or more wireless devices may be provided, e.g. by the network node 110, with an UL grant for UL transmission in subframe n. Here, the UL grant may in addition also specify a particular UL LBT scheme, such as, e.g. a full random back-off procedure. If the network node 110 gains channel access in subframe n−1 or earlier, then the C-PDCCH in subframe n−1 may signal to the wireless devices scheduled for UL transmission in subframe n that they shall instead utilize a different UL LBT scheme. For example, a one-shot UL CCA of 25 μs duration instead.

According to some embodiments, the network node 110 may also transmit information indicating that one or more subframes in the burst of uplink subframes is to be used for enhanced Physical Uplink Control Channel, ePUCCH, transmissions. Optionally, the network node 110 may further transmit information indicating that one or more subframes in the burst of uplink subframes have a gap for an LBT procedure. In other words, in some embodiments, additional bits may be used to indicate cell-specific triggers for ePUCCH transmission, or to indicate which of these upcoming (b−a) UL subframes have a gap for LBT. For example, the offset of the subframe(s) to be used for ePUCCH transmissions, where this subframe(s) lies between the first UL SF at n+a and the last UL SF at n+b, may be indicated explicitly in the C-PDCCH sent in subframe n on the DL.

In some embodiments, the network node 110 may further transmit information indicating whether or not a wireless device 121, which previously has deferred uplink transmissions, are allowed to perform uplink transmissions in the first uplink subframe of the burst of uplink subframes. In other words, in some embodiments, another additional bit may be used to indicate if a wireless device 121 that deferred its UL transmission under Option 2 scheduling are allowed to transmit in the first UL subframe. Optionally, additional bits may be used here to indicate the subframe offset in which such deferred UL transmissions are allowed. This means that, alternatively, the network node 110 may further transmit information indicating at least one offset until the first uplink subframe of the burst of uplink subframes for and after which such uplink transmissions may be performed by the wireless devices 121.

Furthermore, according to some embodiments, the network node 110 may also transmit an indication of an offset until the starting subframe of the burst of uplink subframes for which the switch of LBT procedure is to be performed. In some embodiments, the downlink control channel is a Physical Downlink Control Channel, PDCCH, or a common Physical Downlink Control Channel, C-PDCCH. In other words, according to some embodiments, the indication to switch the UL LBT scheme may be made explicitly using one or more bits, where the bit sequence indicates the subframe offset until the particular UL subframe that is the first UL subframe of a burst. In some embodiments, the switch to a shorter UL CCA may be made implicitly by wireless devices that decode the C-PDCCH in subframe n and/or subframe n−1, and determine that the upcoming DL/UL allocation indicates that an UL subframe is scheduled for subframe n+1. For wireless devices that have an existing UL grant, if they fail to decode the C-PDCCH in a subframe(s) immediately preceding their scheduled UL transmission, these wireless device may, according to some embodiments, proceed with their scheduled UL transmission using the originally assigned UL LBT procedure (if any). It is noted that the C-PDCCH with such an indication may be sent either on the PCell or another SCell. This means that, optionally, in some cases, when the wireless device 121 is configured to provide Licensed Assisted Access, LAA, on a secondary cell, SCell, in the wireless communications network 100, the network node 110 may, according to some embodiments, perform the transmissions in a primary cell, PCell, in the wireless communications network 100, but which correspond to the secondary cell, SCell. Also, in some embodiments, a common control Radio Network Temporary Identifier, CC-RNTI, may be used by the network node 110 in the transmissions.

Figure 12:
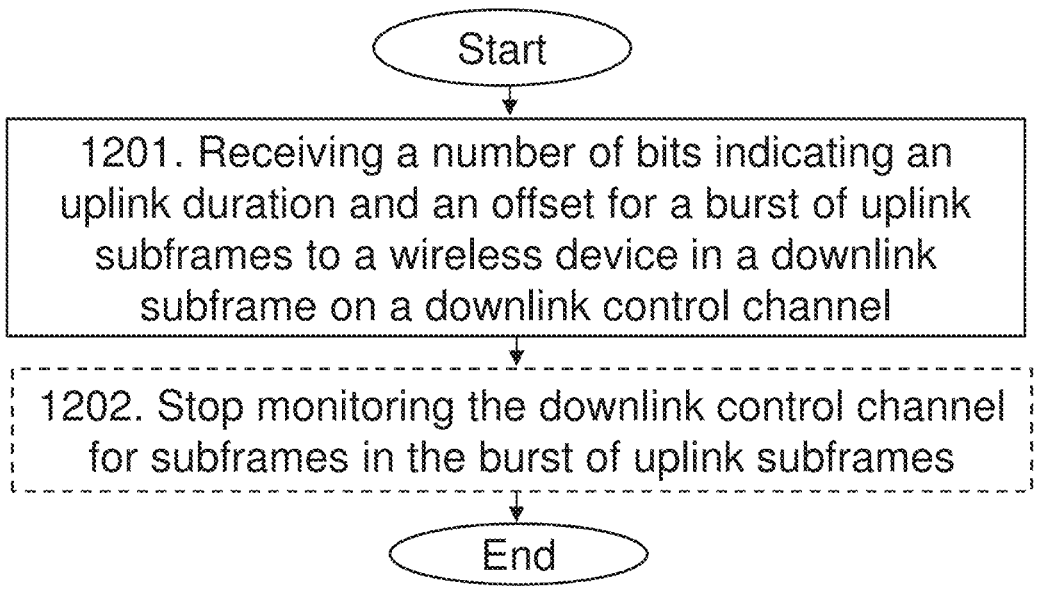
FIG. 12 is a flowchart depicting embodiments of a method in a wireless device.

Example of embodiments of a method performed by a wireless device 121 in the wireless communications network 100, will now be described with reference to the flowchart depicted in FIG. 12. FIG. 12 illustrates an example of actions or operations which may be taken by the wireless device 121. The method may comprise the following actions.

Action 1201

The wireless device 121 may receive a number of bits indicating an uplink duration and an offset for a burst of uplink subframes to a wireless device 121 in a downlink subframe on a downlink control channel. In some embodiments, the offset indicates a number of subframes to the start of the burst of uplink subframes from the downlink subframe, and the uplink duration indicates the number of subframes comprised in the burst of uplink frames. In some embodiments, the wireless device 121 may also receive an indication of a switch of Listen-Before-Talk, LBT, procedure to be utilized by the wireless devices 121 for the burst of uplink subframes.

Action 1202

Optionally, after the reception in Action 1201, the wireless device 121 may stop monitoring the downlink control channel for subframes in the burst of uplink subframes.

Further example embodiments of the network node 110 and the wireless device 121 is described further below and in the accompanying annex.

Further Example Embodiments

According to other aspects of the embodiments herein, some embodiments herein focus on a method for dynamic signaling of the DL/UL allocation of upcoming subframes, where the signaling may be carried in, for example, the cell-specific C-PDCCH. This signaling may be carried, for example, on the same SCell, PCell, MeNB, or SenB for which the indicated DL/UL allocation is applicable, or a MeNB, SeNB, PCell or SCell that is different from the cell to which the DL/UL allocation is applicable, and be sent in one or more consecutive DL subframes. In the case of eLAA, the signaling carried on a licensed PCell may correspond to the DL/UL allocation of an eLAA SCell. The common control RNTI (CC-RNTI) adopted in Rel-13 for the C-PDCCH may also be used for the enhanced C-PDCCH under discussion. If a wireless device 121 has an explicit UL grant and detects a C-PDCCH allocation that conflicts with its UL grant, then priority is given to the UL grant and the wireless device 121 may perform LBT and attempt to send an UL transmission as per its UL grant.

The total number of bits used for signaling the DL/UL allocation may in general be represented as X+Y, where X represents bits allocated for DL subframes, and Y represents bits allocated for UL subframes. As an example, in Rel-13 LAA, four bits are assigned for DL subframe indication (see Table 1), and these bits are sent on DCI Format 1C, i.e., X=4. In this specific case of Format 1C, an additional eleven bits are available for signaling the UL allocation, i.e., X+Y=15 bits at 20 MHz system bandwidth. The bitwidth (X+Y) may be different for other DCI formats and other system bandwidths, for example, DCI Format 1A may carry 29 bits for the overall (X+Y) bit information.

In some embodiments, a bit pair may be allocated for each potential upcoming subframe, e.g. by the network node 110 for the wireless device 121. The UL subframes need not be contiguous, in which case the C-PDCCH signal should be able to signal the occurrence of one or more DL subframes in between a run of UL subframes. As a non-limiting example, Y=2n bits may be used to indicate the characteristics of the next n subframes. Here, for each upcoming subframe, the bit pair may be constructed as indicated in Table 2.

Note that for bit pair '11' used to trigger ePUCCH in a cell-specific manner, the ePUCCH may carry UCI, PRACH, or SR. After the 2n bits, an additional bit may be used to indicate whether the last subframe that was indicated is also the last subframe of the TXOP ('1': yes, '0': no). Another additional bit may be used to indicate if a wireless device 121 that deferred its UL transmission under Option 2 scheduling, as described above, is allowed to transmit in the first UL subframe. Optionally, additional bits may be used to indicate the subframe offset in which such deferred UL transmissions are allowed.

According to some embodiments, if partial UL subframes of sizes small than 13 symbols are available for PUSCH transmission, then a bit triple or 4-tuple may be used to characterize the properties of each subframe. In this case, the additional available values may correspond to the additional possible UL subframe lengths.

TABLE 2

Bit pair for upcoming subframes

| Bit pair | Information |
| --- | --- |
| 00 | This is a DL subframe |
| 01 | This is a full UL subframe (14 symbols, no gaps) |
| 10 | This is a punctured UL subframe with gap at symbol 0 |
| 11 | This is a punctured UL subframe with gap at symbol 0, ePUCCH transmissions are allowed |

As another non-limiting example, the above upcoming subframe type signaling may be implemented with variable-length prefix coding to increase efficiency. This is because a subset of the subframe types is expected to be used more often than the others. For instance, if it is expected that "a full UL subframe (14 symbols, no gaps)" is most often used and "a DL subframe" is least often, a prefix coding as shown in Table 3 may be used. The prefix coding allows more subframes to be signaled using a fixed number of bits on average. For instance, assuming the probabilities for the four subframe types from to top to bottom in Table 3 are 0.5, 0.25, 0.15 and 0.1, respectively, each subframe signaling requires 1.75 bits on average. Hence, six subframes may be signaled on average using 11 bits using the coding in Table 3. This is more than the five subframes that may be signaled according to the coding in Table 2.

TABLE 3

Prefix coding for upcoming subframes

| Bit pair | Information |
| --- | --- |
| 0 | This is a full UL subframe (14 symbols, no gaps) |
| 10 | This is a punctured UL subframe with gap at symbol 0 |
| 110 | This is a punctured UL subframe with gap at symbol 0, ePUCCH transmissions are allowed |
| 111 | This is a DL subframe |

The variable-length prefix coding may allow more subframe types to be signaled without undue increase in the number of bits needed for the signaling. For instance, it may be necessary to signal another UL subframe type: "a punctured UL subframe with gap at symbol 0 and symbol 13." Using a fixed-length approach, each subframe will require three bits to signal. The prefix coding shown in Table 4 may be used to signal these five subframe types more efficiently. Assuming the probabilities for the six subframe types from to top to bottom in Table 3 are 0.5, 0.25, 0.1, 0.05, 0.05 and 0.05, respectively, each subframe signaling requires 2 bits on average. With this coding, the types of five upcoming subframes on average may be signaled using 11 bits. This is more than the three subframes that may be signaled using fixed-length coding.

TABLE 4

Prefix coding for more upcoming subframe types

| Bit pair | Information |
| --- | --- |
| 0 | This is a full UL subframe (14 symbols, no gaps) |
| 10 | This is a punctured UL subframe with gap at symbol 0 |
| 110 | This is a punctured UL subframe with gap at symbol 0, ePUCCH transmissions are allowed |

TABLE 4-continued

Prefix coding for more upcoming subframe types

| Bit pair | Information |
| --- | --- |
| 1110 | This is a punctured UL subframe with gap at symbol 0 and symbol 13 |
| 11111 | This is a full DL subframe |
| 11110 | This is partial DL subframe (9 symbols) sPUCCH/SRS/PRACH transmissions are allowed |

According to the above, in some embodiments, a fixed length of bits may be available for the subframe type signaling using the variable-length prefix coding. In some cases, the subframe type signaling fills the fixed number of bits exactly. In some other cases, a few remaining bits are left. For these cases, an incomplete codeword may be inserted to leave these bits unused according to some embodiments. For instance, if the coding is according to Table 4 and three bits are left, "111" may be inserted into these unused bits.

In some embodiments, the reserved values in the first four bits of the Rel-13 C-PDCCH signal (as in Table 1) may be used to explicitly trigger signalling, such as, for example, sPUCCH, PRACH, or SRS transmissions. As a non-limiting example, the reserved values 14 (bit combination '1110') and 15 (bit combination '1111') may be used to trigger UCI transmission on sPUCCH and SRS transmission in the UpPTS region, respectively. The UpPTS size corresponding to these C-PDCCH values may, for example, be implicitly assumed to be four symbols by the wireless device 121.

Figure 13:
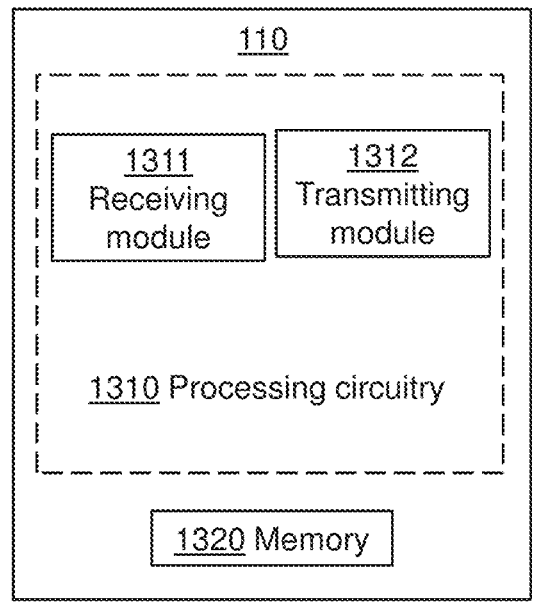
FIG. 13 is a schematic block diagram illustrating embodiments of a network node.
Figure 14:
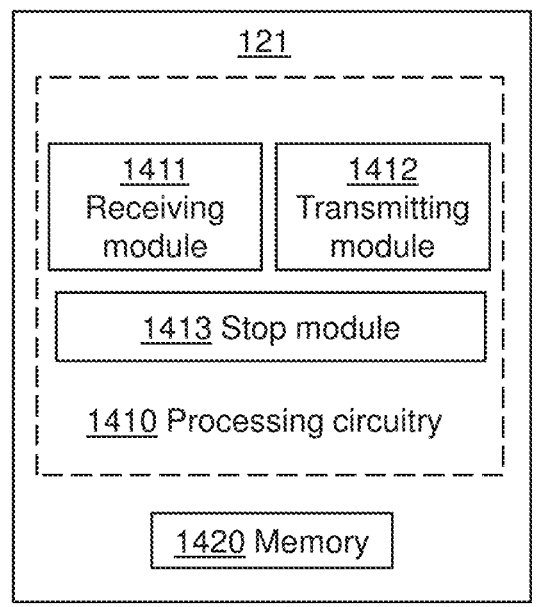
FIG. 14 is a schematic block diagram illustrating embodiments of a wireless device.

To perform the methods described above, a network node 110 and a wireless device 121 are provided. FIGS. 13-14 are a block diagrams depicting the network node 110 and the wireless device 121. The network node 110 is configured to perform the method described for the network node 110 in the above embodiments herein, while the wireless device 121 is configured to perform the method described for the wireless device 121 in the above embodiments herein.

For the network node 110, the embodiments described herein may be implemented through one or more processors 1310 in the network node 110 depicted in FIG. 13, together with computer program code for performing the functions and/or method actions of the embodiments herein. The program code mentioned above may also be provided as a computer program product, for instance in the form of a data carrier carrying computer program code for performing embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110. The network node 110 comprises a receiving module 1311 and a transmitting module 1312 with which the network node 110 may transmit and receive signals to or from wireless devices, such as, e.g. the wireless device 121, in the wireless communications network 100.

The network node 110 or processing circuitry 1310 is configured to, or may comprise the transmitting module 1312 configured to, transmit a number of bits indicating an uplink duration and an offset for a burst of uplink subframes to a wireless device in a downlink subframe on a downlink control channel. In some embodiments, the network node 110 or processing circuitry 1310 is configured to, or may comprise the transmitting module 1312 configured to, transmit an indication of a switch of Listen-Before-Talk, LBT, procedure to be utilized by the wireless devices 121 for the burst of uplink subframes. In some embodiments, the network node 110 or processing circuitry 1310 is configured to, or may comprise the transmitting module 1312 configured to, transmit information indicating that one or more subframes in the burst of uplink subframes is to be used for enhanced Physical Uplink Control Channel, ePUCCH, transmissions, and/or information indicating that one or more subframes in the burst of uplink subframes have a gap for an LBT procedure. In some embodiments, the network node 110 or processing circuitry 1310 is configured to, or may comprise the transmitting module 1312 configured to, transmit information indicating whether or not a wireless device 121, which previously has deferred uplink transmissions, are allowed to perform uplink transmissions in the first uplink subframe of the burst of uplink subframes, or information indicating at least one offset until the first uplink subframe of the burst of uplink subframes for and after which such uplink transmissions may be performed by the wireless devices 121. In some embodiments, the network node 110 or processing circuitry 1310 is configured to, or may comprise the transmitting module 1312 configured to, transmit an indication of an offset until the starting subframe of the burst of uplink subframes for which the switch of LBT procedure is to be performed. In some embodiments, the network node 110 or processing circuitry 1310 is configured to, or may comprise the transmitting module 1312 configured to, when the network node 110 is configured to provide Licensed Assisted Access, LAA, on a secondary cell, SCell, in the wireless communications network 100, perform the transmitting in a primary cell, PCell, in the wireless communications network (100) but which correspond to the secondary cell, SCell. Also, the network node 110 may comprise further modules configured to perform the method according to the embodiments described herein.

The network node 110 further comprises a memory 1320. The memory 1320 may, for example, be used to store applications or programs to perform the methods herein and/or any information used by such applications or programs. The network node 110 may further comprise an input/output interface (not shown), which may be used to communicate over a wired connection with other radio network entities or nodes in the wireless communications network 100.

For the wireless device 121, the embodiments herein may be implemented through one or more processors 1410 in the wireless device 121 depicted in FIG. 14, together with computer program code for performing the functions and/or method actions of the embodiments herein. The program code mentioned above may also be provided as a computer program product, for instance in the form of a data carrier carrying computer program code for performing embodiments herein when being loaded into the wireless device 121. One such carrier may be in the form of a CD ROM disc. It is however feasible with other data carriers such as a memory stick. The computer program code may furthermore be provided as pure program code on a server and downloaded to the wireless device 121. The wireless device 121 comprises a receiving module 1411 and a transmitting module 1412 over which the wireless device 121 may transmit and receive signals to or from network nodes in the wireless communications network 100, such as, e.g. the network node 110. The wireless device 121 may also comprise a stop module 1413.

The wireless device 121 or processing circuitry 1410 is configured to, or may comprise the receiving module 1411 configured to, receive a number of bits indicating an uplink duration and an offset for a burst of uplink subframes to a wireless device 121 in a downlink subframe on a downlink control channel. Here, the offset may indicate a number of subframes to the start of the burst of uplink subframes from the downlink subframe, and the uplink duration may indicate the number of subframes comprised in the burst of uplink frames. Also, the wireless device 121 or processing circuitry 1410 is configured to, or may comprise the receiving module 1411 configured to, receive an indication of a switch of Listen-Before-Talk, LBT, procedure to be utilized by the wireless devices 121 for the burst of uplink subframes. Further, the wireless device 121 or processing circuitry 1410 is configured to, or may comprise the stop module 1411 configured to, stop monitoring the downlink control channel for subframes in the burst of uplink subframes. Also, the network node 110 may comprise further modules configured to perform the method according to the embodiments described herein.

The wireless device 121 further comprises a memory 1420. The memory 1420 may, for example, be used to store applications or programs to perform the methods herein and/or any information used by such applications or programs.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of processing circuits discussed may be provided through the use of dedicated hardware, while others are provided with hardware for executing software, in association with the appropriate software or firmware. Thus, the term "processor" or "controller" as may be used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices. The different actions taken by the different nodes may be implemented with different circuits.

From the above it may be seen that the embodiments may further comprise a computer program product, comprising instructions which, when executed on at least one processor, e.g. the processors 1310, 1410, cause the at least one processor to carry out the method for performing or handling a superposed transmission in a wireless communications network 100. Also, some embodiments may, as described above, further comprise a carrier containing said computer program, wherein the carrier is one of an electronic signal, optical signal, radio signal, or computer readable storage medium.

The terminology used in the detailed description of the particular exemplary embodiments illustrated in the accompanying drawings is not intended to be limiting of the described methods, network node 110 and wireless device 121.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

| Abbreviation | Explanation |
| --- | --- |
| CC | Component Carrier |
| CCA | Clear Channel Assessment |
| C-PDCCH | Common PDCCH |
| CQI | Channel Quality Information |
| DCI | Downlink Control Information |
| DL | Downlink |
| DRS | Discovery Reference Signal |
| eNB | evolved NodeB, base station |
| UCI | Uplink Control Information |
| UE | User Equipment |
| LAA | Licensed-Assisted Access |
| LBT | Listen before talk |
| SCell | Secondary Cell |
| sPUCCH | Short PUCCH |
| SR | Scheduling Request |
| STA | Station |
| LBT | Listen-before-talk |
| LTE-U | LTE in Unlicensed Spectrum |
| MCOT | Maximum Channel Occupancy Time |
| MF | MuLTEfire |
| MSF | Multi-subframe |
| OFDM | Orthogonal Frequency Division Multiplexing |
| PDCCH | Physical Downlink Control Channel |
| PUCCH | Physical Uplink Control Channel |
| PUSCH | Physical Uplink Shared Channel |
| RAT | Radio Access Technology |
| RNTI | Radio Network Temporary Identifier |
| TXOP | Transmission Opportunity |
| UL | Uplink |

ANNEX

Further embodiments of the wireless device 121 and the network node 110 are described and exemplified in the contribution text below.

3GPP TSG RAN WG1 Meeting #84bis
Busan, Korea, 11-15 Apr. 2016
Source: Ericsson
Title: On Signaling of UL Channel Access Parameters
Agenda Item: 7.3.1.5
Document for: Discussion and Decision
Introduction In RAN1#84, the following elements related to the UL LBT procedure were agreed 1) Support for UL LBT procedures based on both a random backoff and a fixed CCA of 25 µs.
2) Flexible timing between UL grant and UL transmission.
3) Enabling PUSCH transmission for a UE in multiple subframes in LAA SCell for both the cross-carrier scheduling case and the self-scheduling case from a single UL grant(s) for the UE in a subframe.

In our companion contribution on the UL subframe structure in time for enhanced LAA, we discuss the need for gaps of different lengths in different situations within a UL subframe. We also discuss LBT procedures in detail. As a part of the objectives of the WID, it was stated that the channel access mechanism shall use the decisions made in RAN1 during Rel-13 as a starting point. In this contribution, we discuss how these factors result in the signaling of some important UL channel access parameters being beneficial.

Discussion

Motivations

LTE is a scheduled system where UL transmissions are controlled by the eNB such that no transmission by any UE occurs unless it is granted and permitted by the eNB.

Moreover, multi-user multiplexing is a key feature for performance efficiency of LTE where multiple users can simultaneously be served in a single subframe. Utilizing this feature in LAA for operation in unlicensed spectrum has considerable importance, since by serving multiple UEs simultaneously the system operates more effectively and consequently unlicensed spectrum is utilized more efficiently. This is aligned with the requirements for proper operation in unlicensed spectrum. On the other hand, LAA UL transmissions are in general subject to LBT. For a group of UEs scheduled by the same eNB for a given subframe, earlier access of any of those UEs may be perceived as interference by the other scheduled UEs and results in their abandoning the corresponding granted UL transmissions due to failed LBT attempts. This scenario can happen if the concurrently scheduled UEs are located such that the transmission by one would interfere with another one. In this case if the eNB schedules these UEs simultaneously, this would most probably result in transmission failure and hence improper operation of eNB for wasting the spectrum. Based on the above analysis and discussion we make the following observation and conclusion:

Observation:
Uncoordinated access to unlicensed spectrum for concurrently scheduled UEs impacts multi-user multiplexing capability of LAA and hence efficient usage of unlicensed spectrum.

Conclusion:
Coordinated channel access among concurrently scheduled UEs should operate efficiently to increase multi-user multiplexing gain.

Based on the design principle concluded above, it is important to increase the probability that concurrently scheduled UEs access unlicensed spectrum simultaneously in an efficient manner to achieve the gains due to multi-user multiplexing. In other words, the eNB should be capable of techniques to at least mitigate the interference caused by its own UEs to themselves. Since the eNB is in control of all transmissions by the UEs, the eNB can as well control the channel access parameters when it is beneficial, such that the chance that all scheduled UEs for a scheduling unit can access the channel simultaneously would increase. In other words by controlling the channel access parameters the eNB is capable of avoiding situations where one of the concurrently scheduled UEs has failed to access to the channel due to transmission by another UE which is scheduled by the same eNB for the same subframe.

Type of LBT Procedure

It has already been agreed to support LBT based on a CCA of at least 25 μs in addition to Category 4 LBT for UL transmissions. When each method is used may depend on channel occupancy time restrictions that are specified or may need to be followed due to regulations. In addition, there may be certain transmissions, such as those that contain HARQ feedback, which can be considered to be transmitted without LBT. Such an option was considered to be for further study (as per agreement during Rel-13) and also was required to not leave a gap of more than 16 μs between the DL and the UL transmission. Considering these options, at the very least, it is necessary for the eNB to inform the UE when each of these LBT options is to be used in order to ensure successful multiplexing of concurrently transmitting UEs.

Observation:

It is beneficial for the eNB to signal to the UE which of the following options to use for LBT in any particular subframe
  LBT based on Category 4
  LBT based on a CCA in a gap of fixed duration of 25 μs
  No LBT for special transmissions containing information such as HARQ feedback with a gap of fixed duration of 16 μs between the DL and UL transmission.

Aspects Related to Gaps of Fixed Duration

One example of concurrent transmission is that in case of CCA of at least 25 μs, the UEs perform CCA of 25 μs only once and at a specific time, for example, right at the beginning of the UL subframe. The UE can start transmission right after the CCA period with the remainder of the first DFTS-OFDM symbol. In principle, since the UL uses single carrier transmission, even partial reception of a DFTS-OFDM symbol is useable by the eNB for data reception. Hence, the possibility of leaving a fraction of an OFDM symbol blank should be allowed. In this case, the concurrently scheduled UEs contend for the channel simultaneously while not interfering with each other and in the absence of other sources of interference, those UEs can access the channel and start transmission at the same time. Another possibility is for the CCA period to begin some time after the subframe boundary. This option is useful when a timing advance command is issued to all the UEs to advance the timing of the UL subframes so as to create a gap between the end of a UL subframe and a subsequent DL subframe. In this case, the CCA duration appears in different locations in the UL subframe depending on whether it is the first subframe in a sequence of UL subframes or not.

Figure 4:
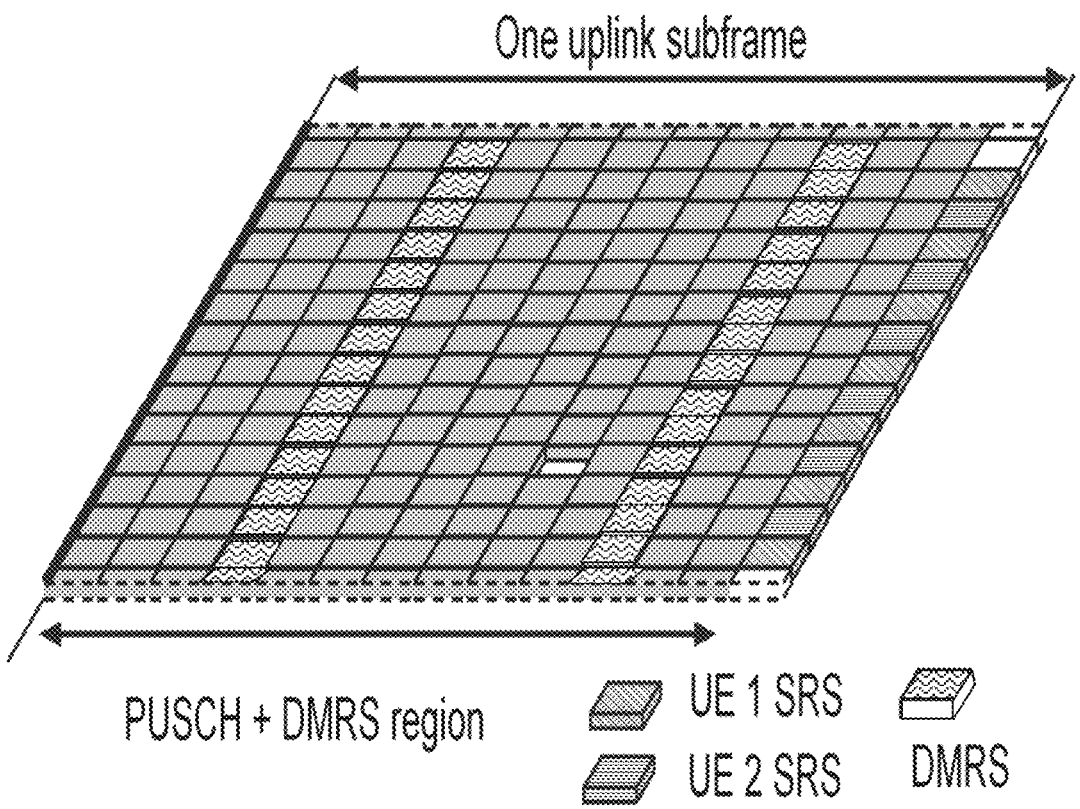
FIG. 4 is a schematic illustration of a Rel-12 uplink subframe.
Figure 5:
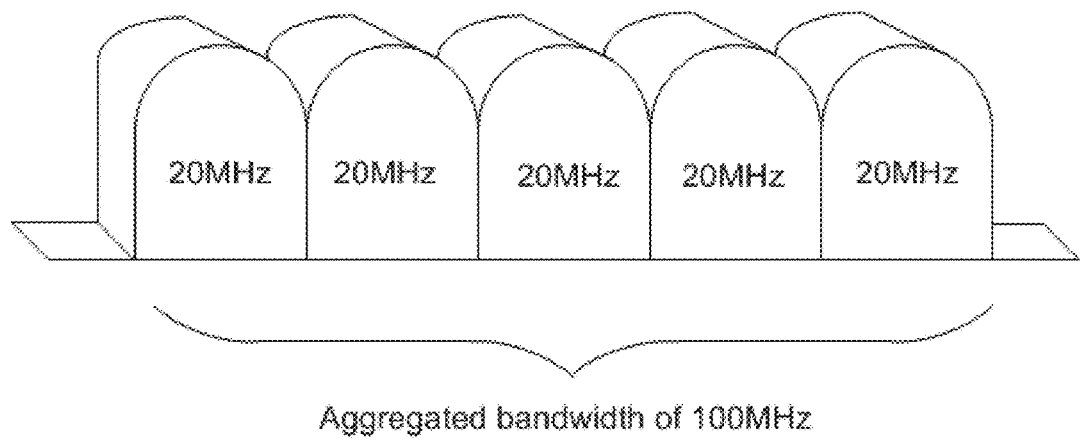
FIG. 5 is a schematic illustration of carrier aggregation.
Figure 6:
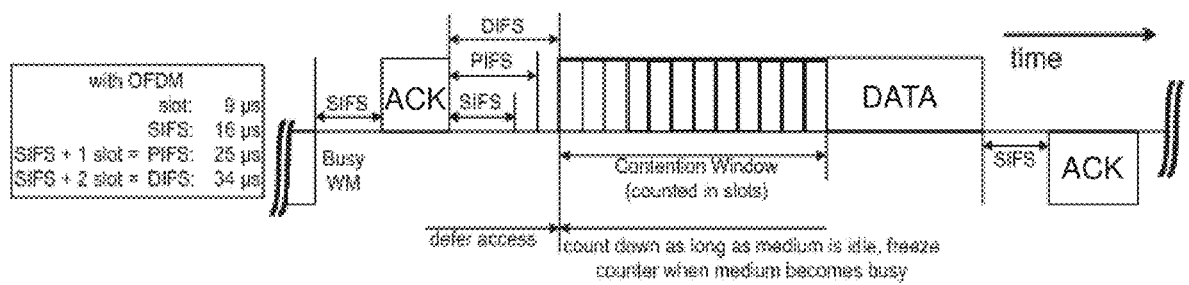
FIG. 6 is a schematic illustration of the listen before talk (LBT) mechanism in Wi-Fi.
Figure 7:
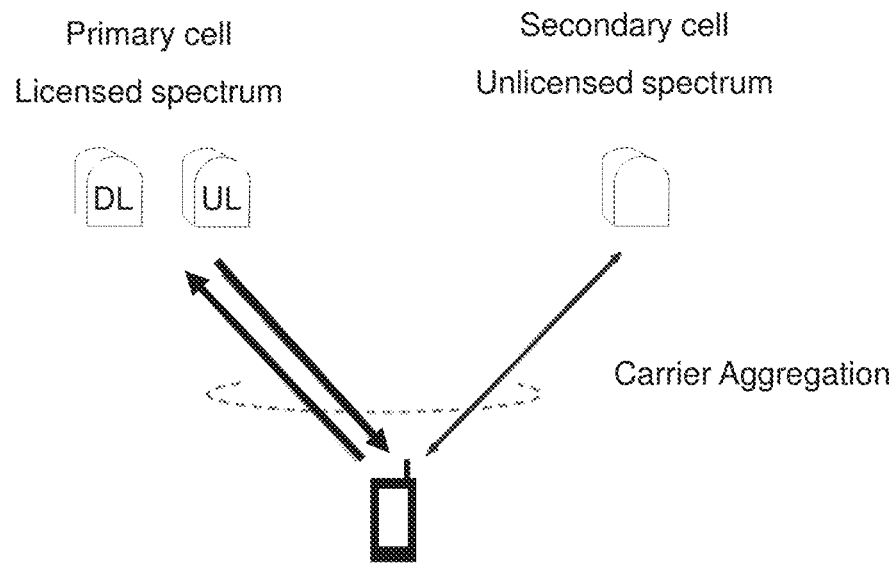
FIG. 7 illustrates licensed-assisted access (LAA) to unlicensed spectrum using LTE carrier aggregation, e.g. a CA-capable UE configured with one LAA SCell.
Figure 8:
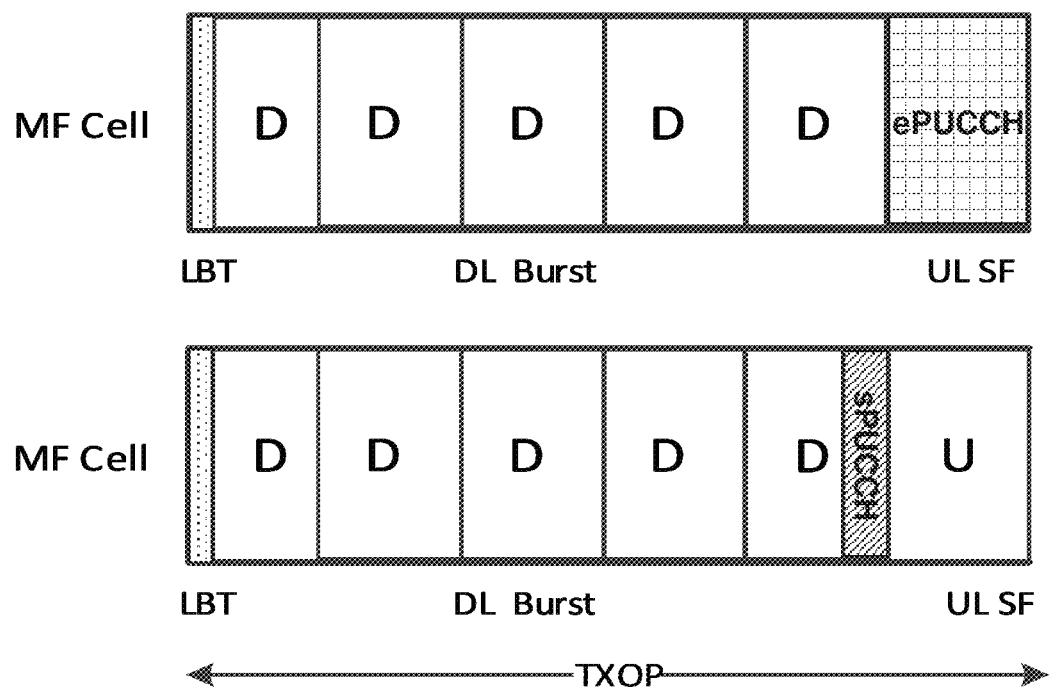
FIG. 8 is a schematic illustration of ePUCCH and sPUCCH within a TXOP.

FIG. 4: Managing the gap between DL and UL transmissions when eNBs do not employ partial transmission time interval within a DL subframe preceding a UL subframe.

Thus, when a gap of a fixed duration of 25 μs or 16 μs is used, there may be situations where it is beneficial for the gaps to appear in different locations within the first DFTS-OFDM symbol within the subframe. Therefore, it may be beneficial to signal this aspect to the UE since the UE may not be aware whether the previous subframe is a DL or a UL subframe and it is not desirable to force the UE to perform a DL subframe detection before the first UL subframe it transmits. If one considers the two options for the placement of the gap, i.e., at the beginning of the UL subframe or after the DL subframe ends, one effective way to achieve this would be to signal to the UE whether it should assume the gap occurs after a period equal to the signalled timing advance value relative to the UL subframe boundary or whether the gap occurs immediately after the subframe boundary.

Observation:

When the UE is directed to use a gap of fixed duration for LBT within the UL subframe, it is beneficial for the eNB to signal to the UE where the gap should be located. A simple indicator could be to indicate to the UE whether the gap should be delayed by a duration equal to the signaled TA value relative to the start of the UL subframe or not. Aspects related to Category 4 LBT Aspects related to Category 4 LBT. It has been agreed that a category 4 LBT mechanism will be supported for UL LBT. The adjustment of the contention window size (CWS) can be done on a per UE basis using a similar methodology as agreed in Rel-13. That means that the CWS is increased if 80% of the UE's UL transmissions in its previous UL transmission burst have failed and it is reset otherwise. Also, coordination of transmissions from different UEs using different random backoff counters but scheduled in the same subframe can be achieved by signalling the time at which UEs should start transmissions. This is already achieved if the signalling of the gaps, observed as being necessary in the previous section, is supported. In the following, we discuss aspects of category 4 LBT operation that point to the benefits of managing some parts of the category 4 LBT procedure at the eNB and signalling appropriate parameters to the UE.

Different UEs may be scheduled in different subframes in a sequence of UL subframes. Also, the gaps between the end of a transmission burst and the scheduled UL subframe for which a UE needs to perform Category 4 LBT may vary significantly in size. Also, an eNB may schedule a UE so that the maximum channel occupancy time (MCOT) restrictions, require that the UE can perform a Cat 4 LBT prior to its transmission. However the scheduling is completely in control of eNB and the responsibility to meet these MCOT requirements is up to the eNB.

Considering these factors, it is beneficial for the eNB to know the size of the random counters being used by the UEs so that the eNB can ensure that the UEs that are jointly scheduled in a subframe have a greater likelihood of completing their random backoffs in time for transmission in the scheduled subframe. For instance, if an eNB schedules a UE that has a random backoff counter of 10 in a UL subframe where the gap between the end of the previous subframe and the scheduled subframe is only one DFTS-OFDM symbol long, then, the assignment would simply be wasted. This will force the eNB to always be conservative in scheduling UL subframes that use category 4 LBT which would limit efficiency. In another example, if a contention window size of 1023 is supported and the UE draws a random counter larger than 440 and the eNB scheduled a UL transmission 4 ms after the UL grant on the DL, there would not be enough time for the UE to complete its backoff even if the channel was completely idle. Thus, the eNB would need to use a higher scheduling delay in this case. If the UE draws the random counter, there is no way for the eNB to know what was drawn and thus it would be forced to be very conservative on scheduling delay which would be disastrous for performance.

Considering these factors and that signalling of the random backoff counter to the UE is completely impractical, this implies that the generation of the random backoff counter and management of the contention window sizes should be allowed to be performed at the eNB. Having this functionality being handled by the eNB could potentially be avoided if the category 4 LBT operation is limited to always use the highest priority class with the maximum contention window size being limited to 7. In this case, the contention window periods mostly fit within one or two DFTS-OFDM symbols so that the impact on performance is not very significant even if additional scheduling constraints are not imposed.

Another option that may be considered is to manage the contention window sizes at the eNB and let the UE generate its own random backoff counters when the contention window size is low, but generate the random backoff counter at the eNB when the contention window size is higher. This has the benefit of reducing signalling overhead (although this may be a marginal reduction) in lower load conditions. The above discussion leads to the following observations.

Observation:
When the UE is directed to use a category 4 LBT procedure within the UL subframe, it is beneficial to support one of the following signalling options.
  eNB signals the random backoff counter to a UE for a specific scheduled subframe
  eNB signals the contention window size to a UE for a specific scheduled subframe (the UE draws the random backoff counter based on the signalled contention window size)

Another aspect to be taken into account when the random backoff counter is supplied by the eNB is whether the UE should use a new counter provided by the UE or whether it should use the remaining value from a previous backoff procedure that was not successfully completed. In this case, it is better for the UE to simply use the previous value or alternately choose whichever value happens to be lower.

When a UE is scheduled in multiple consecutive subframes one option is to provide LBT parameters for each scheduled subframe. Another option is to simplify the signalling and allow the UE to use the previously provided LBT parameters until they are updated by the new ones.

Category 4 LBT can generally be used to start a sequence of UL subframes so that the MCOT requirements are met without any linkage to other DL subframes that may have been transmitted earlier. However, if the eNB decides to occupy the channel in the subframe immediately preceding the first subframe in the sequence of UL subframes for which the UE has been asked to perform a Category 4 LBT procedure, the UE could also perform a CCA with a fixed duration 25 μs without violating the MCOT requirements. In this case, if the UE detects this DL subframe preceding the UL subframe, it would be useful for the UE to switch from the Category 4 LBT procedure to the fixed CCA duration. Such a switch could be executed by the UE simply by detection of a DL subframe in a time window immediately preceding the UL subframe, but to reduce ambiguity regarding which of the UL subframes can switch and which cannot, it may be beneficial to introduce some signalling that indicates to the UE when such a switch in LBT procedures can be executed. This signalling could be sent in the common PDCCH in the DL subframe.

Observation:
It is beneficial in some cases for the UE to switch its LBT procedure from a Category 4 LBT procedure to a CCA within a gap of fixed duration of 25 is when a DL subframe is present prior to the UL subframe so that MCOT requirements can be met with the CCA of fixed duration.

Signalling
It is important to note that the LAA design should be flexible enough to allow either eNB or UE to control the LBT parameters depending on the load, deployment scenario, management complexity, etc. All these design goals can be achieved by supporting some signalling in LAA design to instruct UEs regarding the LBT option and the corresponding parameters to be used. Since in Rel-13 common PDDCH DCI for LAA signalling purposes is already introduced, it can be reused for signalling LBT related parameters as well when appropriate. Similarly, UL grants can also contain LBT related parameters that can be communicated in a UE-specific manner.

Therefore, based on the discussion in this and previous sections, we propose the following:

Proposal:
The LAA UL LBT parameters can be signaled to UEs.
The signaling of UL LBT parameters can include the following information:
  LBT option to use:
    LBT based on Category 4 with one of the following options to be used by the UE (UE assumes a gap in the $1^{st}$ DFTS-OFDM symbol with transmission starting in the $2^{nd}$ DFTS-OFDM symbol of the UL subframe)
      Use the random backoff counter signaled by the eNB
      Generate the random backoff counter at the UE based on a contention window size signaled by the eNB
      Generate the random backoff counter at the UE based on a contention window whose size signaled by the eNB
    LBT in a gap of duration 25 μs with one of the following options to be used by the UE (Transmission starts in the second OFDM symbol
      The gap starts at the beginning of the UL subframe
      The gap starts TA microseconds after the beginning of the UL subframe where TA is the timing advance value
    No LBT with a gap of 16 μs
      Note: This option is targeted for special transmissions containing information such as HARQ feedback with a gap of fixed duration of 16 μs between the DL and UL transmission.
  Consider the possibility for the UL LBT procedure at the UE to switch from its original assignment indicating Category 4 LBT to a CCA within a gap of 25 μs under certain conditions. The following conditions can be considered for the switch.
    Signaling is received within a common PDCCH in a DL subframe indicating that UEs scheduled in the particular UL subframe can use a CCA within a fixed gap of 25 μs
    A DL subframe is detected within a window of subframes immediately preceding the UL subframe in which the UE has been scheduled with a Category 4 LBT Note: In the absence of new UL LBT parameters, UE assumes the previously signaled LBT parameters. It is the eNB's responsibility to ensure that channel access requirements are fulfilled Conclusion In this contribution we discussed the benefits of signaling UL channel access parameters. Based on the discussion we proposed the following:

Proposals:
The LAA UL LBT parameters can be signaled to UEs.
The signaling of UL LBT parameters can include the following information:
  LBT option to use:
    LBT based on Category 4 with one of the following options to be used by the UE (UE assumes a gap in the $1^{st}$ DFTS-OFDM symbol with transmission starting in the $2^{nd}$ DFTS-OFDM symbol of the UL subframe)
      Use the random backoff counter signaled by the eNB
      Generate the random backoff counter at the UE based on a contention window size signaled by the eNB
      Generate the random backoff counter at the UE based on a contention window whose size signaled by the eNB
    LBT in a gap of duration 25 µs with one of the following options to be used by the UE (Transmission starts in the second OFDM symbol
      The gap starts at the beginning of the UL subframe
      The gap starts TA microseconds after the beginning of the UL subframe where TA is the timing advance value
    No LBT with a gap of 16 µs
      Note: This option is targeted for special transmissions containing information such as HARQ feedback with a gap of fixed duration of 16 µs between the DL and UL transmission.
  Consider the possibility for the UL LBT procedure at the UE to switch from its original assignment indicating Category 4 LBT to a CCA within a gap of 25 µs under certain conditions. The following conditions can be considered for the switch.
    Signaling is received within a common PDCCH in a DL subframe indicating that UEs scheduled in the particular UL subframe can use a CCA within a fixed gap of 25 µs
    A DL subframe is detected within a window of subframes immediately preceding the UL subframe in which the UE has been scheduled with a Category 4 LBT
  Note: In the absence of new UL LBT parameters, UE assumes the previously signaled LBT parameters. It is the eNB's responsibility to ensure that channel access requirements are fulfilled

The invention claimed is:

1. A method performed by a network node in a wireless communications network, the method comprising:
  transmitting a plurality of bits indicating an uplink duration and an offset for a burst of uplink subframes to a wireless device in a downlink subframe on a downlink control channel; and
  transmitting information indicating that one or more subframes in the burst of uplink subframes is to be used for enhanced Physical Uplink Control Channel (ePUCCH) transmissions, and information indicating that one or more subframes in the burst of uplink subframes have a gap for a Listen-Before-Talk (LBT) procedure, wherein the method further comprises:
  transmitting information indicating whether or not the wireless device, which previously has deferred uplink transmissions, is allowed to perform uplink transmissions in the first uplink subframe of the burst of uplink subframes.

2. The method of claim 1, wherein the offset indicates a number of subframes to the start of the burst of uplink subframes from the downlink subframe, and the uplink duration indicates the number of subframes comprised in the burst of uplink frames.

3. The method of claim 1, further comprising
  transmitting an indication of a switch of Listen-Before-Talk (LBT) procedure to be utilized by the wireless device for the burst of uplink subframes.

4. The method of claim 1, further comprising transmitting information indicating at least one offset until the first uplink subframe of the burst of uplink subframes for and after which such uplink transmissions may be performed by the wireless device.

5. The method of claim 1, further comprising transmitting an indication of an offset until the starting subframe of the burst of uplink subframes for which a switch of LBT procedure is to be performed.

6. The method of claim 1, wherein the downlink control channel is a Physical Downlink Control Channel (PDCCH) or a common Physical Downlink Control Channel (C-PDCCH).

7. The method of claim 1, wherein the network node is configured to provide Licensed Assisted Access (LAA) on a secondary cell (SCell) in the wireless communications network and wherein the transmitting is performed in a primary cell (PCell) in the wireless communications network but correspond to the SCell.

8. The method of claim 7, wherein a common control Radio Network Temporary Identifier (CC-RNTI) is used in the transmissions.

9. The method of claim 1, wherein the offset indicates a number of subframes from the downlink subframe to a point in the burst of uplink subframes.

10. A network node in a wireless communications network, the network node comprising a processor and a memory operatively coupled to the processor, the memory storing instructions for execution by the processor whereby the network node is configured to:
  transmit a plurality of bits indicating an uplink duration and an offset for a burst of uplink subframes to a wireless device in a downlink subframe on a downlink control channel; and
  transmit information indicating that one or more subframes in the burst of uplink subframes is to be used for enhanced Physical Uplink Control Channel (ePUCCH) transmissions, and/or information indicating that one or more subframes in the burst of uplink subframes have a gap for a Listen-Before-Talk (LBT) procedure, wherein the network node is further configured to transmit information indicating whether or not the wireless device, which previously has deferred uplink transmissions, are allowed to perform uplink transmissions in the first uplink subframe of the burst of uplink subframes.

11. The network node of claim 10, wherein the offset indicates a number of subframes to the start of the burst of uplink subframes from the downlink subframe, and the uplink duration indicates the number of subframes comprised in the burst of uplink frames.

12. The network node of claim 10, wherein the network node is further configured to transmit an indication of a switch of Listen-Before-Talk (LBT) procedure to be utilized by the wireless device for the burst of uplink subframes.

13. The network node of claim 10, wherein the network node is further configured to transmit information indicating at least one offset until the first uplink subframe of the burst of uplink subframes for and after which such uplink transmissions may be performed by the wireless device.

14. The network node of claim 10, wherein the network node is further configured to transmit an indication of an offset until the starting subframe of the burst of uplink subframes for which a switch of LBT procedure is to be performed.

15. The network node of claim 10, wherein the downlink control channel is a Physical Downlink Control Channel (PDCCH) or a common Physical Downlink Control Channel (C-PDCCH).

16. The network node of claim 10, wherein the network node is configured to provide Licensed Assisted Access (LAA) on a secondary cell (SCell) in the wireless communications network and wherein the transmitting is performed by the network node in a primary cell (PCell) in the wireless communications network but correspond to the SCell.

17. The network node of claim 16, wherein a common control Radio Network Temporary Identifier (CC-RNTI) is used in the transmissions.

18. A method performed by a wireless device in a wireless communications network, the method comprising:
receiving, in a downlink subframe on a downlink control channel, a plurality of bits indicating an uplink duration and an offset for a burst of uplink subframes; and
receiving, from a network node, information indicating that one or more subframes in the burst of uplink subframes is to be used for enhanced Physical Uplink Control Channel (ePUCCH) transmissions, and/or information indicating that one or more subframes in the burst of uplink subframes have a gap for a Listen-Before-Talk (LBT) procedure, wherein the method further comprises receiving information indicating whether or not the wireless device, which previously has deferred uplink transmissions, are allowed to perform uplink transmissions in the first uplink subframe of the burst of uplink subframes.

19. The method of claim 18, wherein the offset indicates a number of subframes to the start of the burst of uplink subframes from the downlink subframe, and the uplink duration indicates the number of subframes comprised in the burst of uplink frames.

20. The method of claim 18, further comprising
stop monitoring the downlink control channel for subframes in the burst of uplink subframes.

21. The method of claim 18, further comprising receiving an indication of a switch of Listen-Before-Talk (LBT) procedure to be utilized by the wireless device for the burst of uplink subframes.

22. A wireless device in a wireless communications network, the wireless device comprising a processor and memory operatively coupled to the processor, the memory comprising program instructions for execution by the processor, whereby the wireless device is configured to:
receive, in a downlink subframe on a downlink control channel, a plurality of bits indicating an uplink duration and an offset for a burst of uplink subframes; and
receive, from a network node, information indicating that one or more subframes in the burst of uplink subframes is to be used for enhanced Physical Uplink Control Channel (ePUCCH) transmissions, and/or information indicating that one or more subframes in the burst of uplink subframes have a gap for a Listen-Before-Talk (LBT) procedure, wherein the wireless device is further configured to receive information indicating whether or not the wireless device, which previously has deferred uplink transmissions, are allowed to perform uplink transmissions in the first uplink subframe of the burst of uplink subframes.

23. The wireless device of claim 22, wherein the offset indicates a number of subframes to the start of the burst of uplink subframes from the downlink subframe, and the uplink duration indicates the number of subframes comprised in the burst of uplink frames.

24. The wireless device of claim 22, wherein the wireless device is further configured to stop monitoring the downlink control channel for subframes in the burst of uplink subframes.

25. The wireless device of claim 22, wherein the wireless device is further configured to receive an indication of a switch of Listen-Before-Talk (LBT) procedure to be utilized by the wireless device for the burst of uplink subframes.

26. A non-transitory computer-readable medium comprising, stored thereupon, instructions that, when executed on at least one processor of a wireless device in a wireless communications network, cause the wireless device to:
receive a plurality of bits indicating an uplink duration and an offset for a burst of uplink subframes, the plurality of bits received in a downlink subframe on a downlink control channel; and
receive, from a network node, information indicating that one or more subframes in the burst of uplink subframes is to be used for enhanced Physical Uplink Control Channel (ePUCCH) transmissions, and/or information indicating that one or more subframes in the burst of uplink subframes have a gap for a Listen-Before-Talk (LBT) procedure, wherein instructions that, when executed on the at least one processor of the wireless device in the wireless communications network, further cause the wireless device to: receive information indicating whether or not the wireless device, which previously has deferred uplink transmissions, are allowed to perform uplink transmissions in the first uplink subframe of the burst of uplink subframes.

* * * * *